Oct. 6, 1959  E. C. DENCH  2,907,913
TRAVELING WAVE OSCILLATOR
Filed Feb. 16, 1956  2 Sheets-Sheet 1
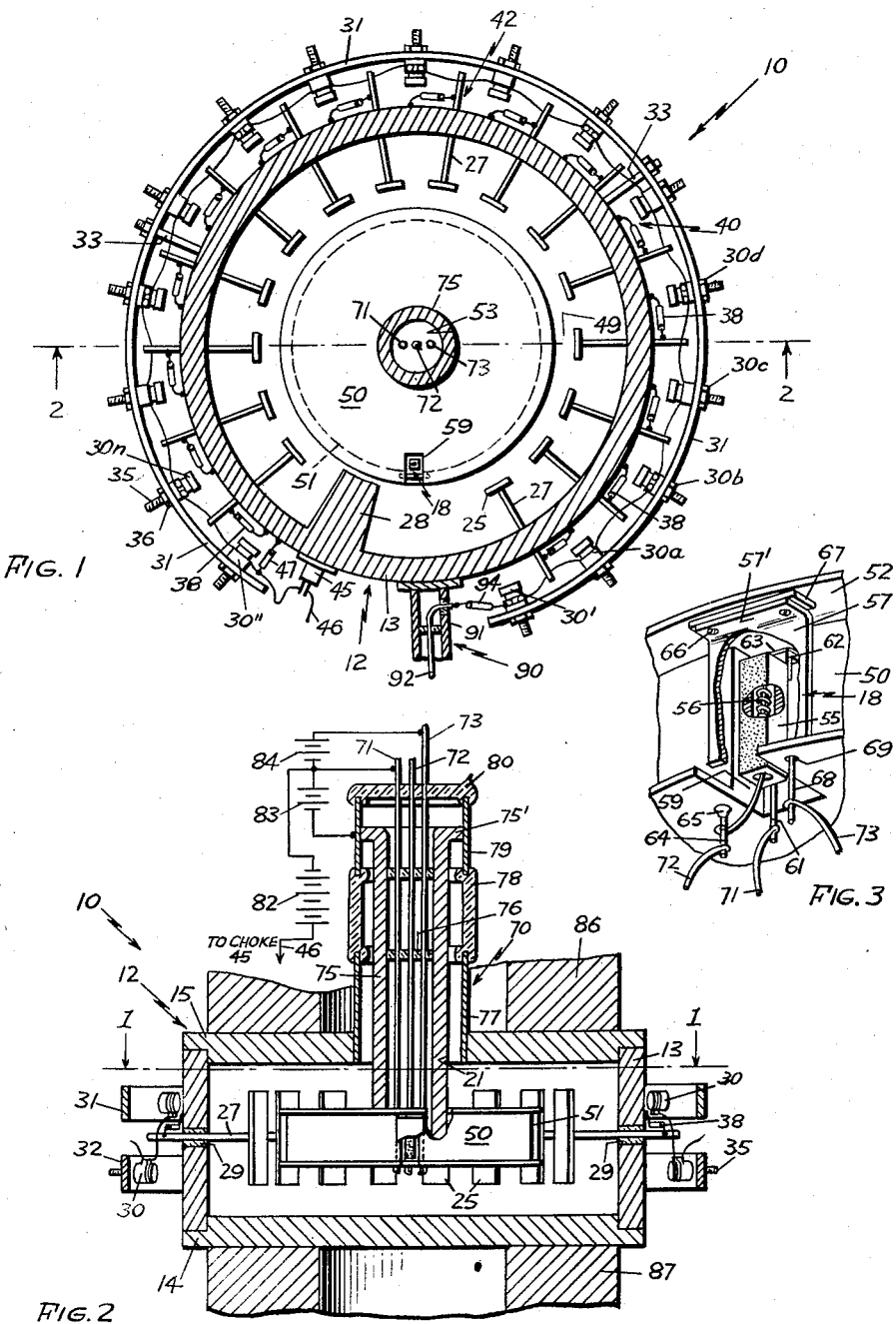
INVENTOR
EDWARD C. DENCH
BY Elmer J. Gorn
ATTORNEY

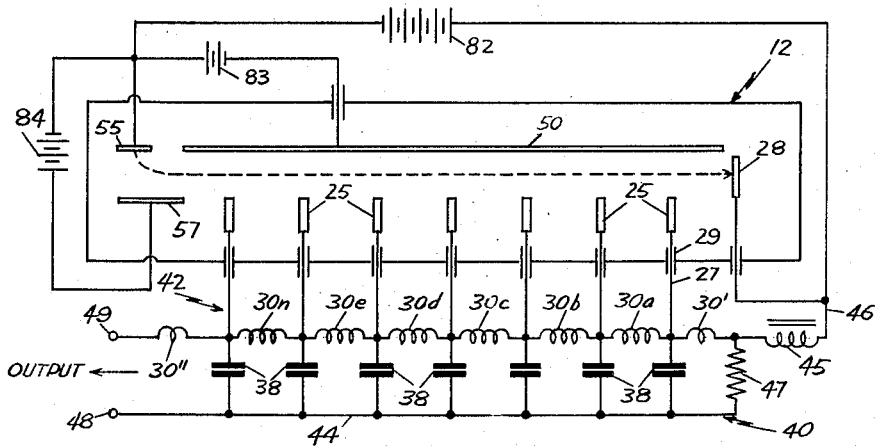

2,907,913

TRAVELING WAVE OSCILLATOR

Edward C. Dench, Needham, Mass., assignor to Raytheon Company, a corporation of Delaware Application February 16, 1956, Serial No. 565,845

12 Claims. (Cl. 315—3.5)

This invention relates to traveling wave oscillators, and more particularly relates to traveling wave oscillators adapted for use over a wide frequency band at relatively low frequencies and employing a periodic slow wave energy propagating structure including a network consisting of lumped circuit elements.

Traveling wave oscillators are known in which radio frequency energy produced therein travels in a direction opposite to the direction of propagation of the electron beam. Such oscillators include a periodic slow wave propagating structure having distributed inductance and capacitance, such as a helix or vane-type structure. Such structures have the properties of an electrical filter; that is, waves can be propagated over the pass band of the structure. Traveling wave oscillators make use of the interaction between an electron beam moving along paths adjacent the periodic structure and the electromagnetic field of the wave guided by said periodic structure.

The electromagnetic field along such a structure may be considered to consist of an infinite number of superimposed traveling waves or space harmonics, each having phase velocities $V_p$ given by $$V_p = \frac{\cdot \omega \Delta}{\psi + 2\pi n}$$

where $\Delta$ is the pitch or length of one network section $\psi$ is the phase shift per section, and $n$ is the number of the space harmonic, for example, $n=0$, $\pm 1$, $\pm 2$, etc. The phase velocity of the space harmonics may be either positive or negative, depending upon the value of $n$. When $V_p$ has a positive value, the phase velocity is in the same direction as the energy or group velocity and the corresponding phase harmonics may be referred to as forward waves. On the other hand, when $V_p$ is negative, the phase velocity is in a direction opposite to the energy or group velocity, and the corresponding waves then are referred to as negative space harmonics or backward waves. If an electron beam is propagated in the direction of one of these backward waves at a velocity substantially equal to the phase velocity of the backward wave, interaction will take place between the beam and the traveling wave, and a progressive modulation of the electron beam is obtained such that energy will be transferred from the electron beam to the electromagnetic field, and the energy given to the backward wave will be transferred along the periodic structure toward the electron beam source.

When the electron beam current exceeds a critical current at which oscillations can begin, and when the electron beam velocity is substantially equal to the velocity of one of the space harmonics, such as a backward wave, oscillations will be generated within the tube; these oscillations will propagate along the periodic structure and may be extracted at one end of the periodic structure.

In accordance with this invention, the periodic slow wave energy propagating structure includes a lumped constant network which may be positioned externally of the evacuated envelope of the traveling wave tube. This network consists of several substantially identical sections, each consisting of at least one lumped inductive element and at least one lumped capacitive element associated therewith. A plurality of spaced electrically conductive members, referred to as anode members since they are maintained at a potential positive with respect to other portions of the traveling wave tube, are connected to appropriate points along the aforesaid network, as for example, to junction points of successive network sections. These anode members which, in conjunction with the aforesaid network, form a periodic slow wave energy propagating structure or delay structure, may be located within the evacuated envelope of the tube and external electrical connection to the network may be made by lead-in members insulated from and sealed within the tube envelope. Energy is extracted from one end of said network, while the opposite end thereof can be terminated in its characteristic impedance.

An electron beam is caused to travel along the tube in proximity to the anode members with an average velocity substantially equal to that of one of the aforesaid space harmonics, whereby oscillations are produced by the interaction of the electron beam and the appropriate space harmonic. By virtue of the lumped constant periodic delay structure, operation over a wide frequency band at relatively low frequencies may be obtained, as compared with oscillators utilizing a distributed periodic delay structure.

In a first type of traveling wave oscillator, the electron beam is accelerated by an electric field associated with the electron gun and, in some instances, in an axial magnetic field for focusing the electron beam. In a second type of backward wave oscillator, the beam moves through a magnetic field which is arranged transversely to an electric field which may be produced by a voltage supplied between the periodic delay structure and either the electron source or an auxiliary negative electrode. In the first type of oscillator, the electron beam velocity is dependent upon the magnitude of the voltage which causes acceleration of the electrons; in the second type, the electrode beam velocity is directly a function of the aforesaid voltage and is directly determined by the ratio of the electric and magnetic field strengths. Such oscillators may be tuned over a wide range of frequencies by varying the electron beam velocity through adjustment of a voltage as well as by adjustment of the transverse magnetic field strength in those oscillators employing a transverse magnetic field.

For a better understanding of the invention, together with further objects thereof, reference is made to the following description, taken in conjunction with the accompanying drawing wherein:

Fig. 1 is a cross-sectional view, taken along line 1—1 of Fig. 2, of one embodiment of a traveling wave oscillator according to the invention;

Fig. 2 is a sectional view of the oscillator tube illustrated in Fig. 1;

Fig. 3 is a detail view illustrating the electron gun assembly of the oscillator of Figs. 1 and 2;

Fig. 4 is a schematic circuit diagram of a tube similar to that of Figs. 1 and 2;

Fig. 5 is a schematic circuit diagram of a traveling wave tube similar to that shown in Fig. 4, utilizing a different periodic slow wave propagating structure; and Fig. 6 is a cross-sectional view of a modification of the device of Figs. 1 and 2 wherein means are provided for cooling said device.

Referring now to Figs. 1 to 3 of the drawing, a traveling wave tube 10 is shown which comprises a cylindrical evacuated envelope 12 consisting of a hollow electrically conductive cylinder 13 whose ends are closed by two cover plates 14 and 15. The upper cover plate 15 contains a centrally disposed aperture 21 through which extends an assembly 70, which subsequently will be described in detail. In some cases the tube envelope may be constructed of a vitreous substance or some other electrically insulating material instead of being made of electrically conductive material. In such cases, the insulators 29 and the lead-in members 27 may be omitted.

Positioned within the evacuated envelope 12 is an arcuate array of anode elements 25 concentric with the cylinder 13 of envelope 12 and consisting, for example, of electrically conductive plates attached to rigid lead-in members 27 extending through cylinder 13 into the region outside envelope 12. The inner surface of anode elements 25 may be curved slightly to conform to the curvature of the locus of the elements. Lead-in members 27 are electrically insulated from the tube envelope 12 and are rigidly supported with respect to the cylinder 13 of the tube envelope by insulators 29 set in cylinder 13. Successive lead-in members 27 are interconnected electrically by coils 30a, 30b, 30c, . . . 30n which, together with coils 30' and 30", connected to coils 30a and 30n, respectively, will be referred to generically by the reference numeral 30. Coils 30 are mounted on a pair of concentric rings 31 and 32 rigidly supported from the tube envelope 12 by support rods 33. The inductance of the coils 30 may be varied by movement of cores within the coils; the position of the cores is adjusted by threaded screws 35 locked in position by nuts 36. The lead-in members 27 are each electrically connected to cylinder 13 of tube envelope 12 through capacitors 38, all of which are preferably of substantially identical capacitance. In tubes in which the tube envelope is constructed of a vitreous material or other electrically insulating material, the ends of the capacitors 38 not connected to lead-in members 27 would be connected to a common electrical conductor or bus rather than to the tube envelope, as shown in Fig. 1. The coils 30 and capacitors 38 combine to form an external electrical network 40. In some instances, it may be desirable to employ variable capacitors instead of the fixed capacitors shown in Figs. 1 and 2 in order to adjust readily the parameters of the sections of the network 40. The network 40, in conjunction with the anode elements 25, constitutes a periodic slow wave energy propagating anode structure 42 consisting of a plurality of substantially identical sections made up at least partially of a coil 30 and a capacitor 38. The anode elements 25, together with lead-in members 27, contribute to the inductance and capacitance of the network 40, and for proper design thereof, consideration must be given to this inductance and capacitance.

An elongated electrode 50, otherwise referred to as a sole, is contained within the tube envelope 12; the sole is concentrically arranged with respect to the array of anode elements and is separated therefrom to form an interaction space 49 through which the electron beam generated by the electron gun passes. The periphery or wall 51 of sole 50, which is coextensive with the array of anode elements 25, is substantially circular in a tube of cylindrical construction, such as that shown in Figs. 1 to 3. If the tube and the anode array are of linear construction, however, the sole 50 likewise would be linear, as shown diagrammatically in Figs. 4 and 5.

As indicated in Figs. 1 to 3, the sole 50 consists of a cylindrical block of electrically conductive material, having a flange portion 52, and a centrally located aperture 53, whose functions will be described later. It should be understood, however, that the sole may be a cylindrical tubular member whose outer periphery coincides with that of the solid member illustrated in Figs. 1 to 3. A sole constructed of a solid block of material is somewhat stronger mechanically than a tubular sole and permits of more rigid mounting of the elements of the electron gun, now to be described.

The electron gun 18 includes a cathode 55, a heater 56, and an auxiliary electrode or accelerating anode 57, as indicated in detail in Fig. 3. The cathode 55 is positioned within a recess 59 in the wall 51 of the sole; the cathode may be in the form of a rectangular body provided with a circular bore in which the heater 56 is inserted. The cathode 55 has at least the surface facing the interaction space 49 between the wall 51 of the sole and the various anode elements 25 coated with an electron-emissive material. The cathode is provided with a rigid electrically conductive stake 61 which may be spot-welded to the cathode near one end. The cathode 55 is supported by means of a bracket 62, which may be secured, as by brazing, to the cathode at one end, and attached, as by insulating screws (not shown) to a portion of the sole at the bottom of recess 59. The cathode is electrically insulated from the sole by means of a spacer 63 of electrically insulating material. One end of the heater 56 is attached to the inner wall of cathode 55 and the other end is connected to a stake 64 insulatedly mounted by means of a bushing 65 on the bottom face of sole 50. The auxiliary electrode 57, which, in effect, is an accelerating anode for permitting the attainment of the proper electron beam trajectory, is supported from the sole by means of insulating screws 66 which pass through a flange portion 57' of the auxiliary electrode 57 and into the upper sole flange 52. An electrically insulated spacer 67 provides for electrical isolation of the auxiliary electrode 57 and sole 50. An electrically conductive stake 68 is affixed to one end of the auxiliary electrode 57 and is electrically insulated from sole 50 by virtue of its passage through an aperture 69 to the sole.

Electrical connection to the cathode, heater and auxiliary electrode is made by leads 71, 72 and 73, respectively, attached to respective stakes 61, 64 and 68. The electrical connections 71, 72 and 73 are brought out from the tube through a lead-in assembly 70 which includes an elongated electrically conductive tubular sole-supporting cylinder 75, one end of which is affixed to the periphery of the central aperture 53 in sole 50. The electrical connections are insulatedly supported from the supporting cylinder 75 by one or more glass beads 76. The lead-in assembly 70 also includes an electrically conductive sleeve 77 which is inserted in an aperture in upper cover plate 15 and is securely sealed thereto. A section of vitreous tubing 78 interconnects sleeve 77 and a second electrically conductive sleeve 79; the other end of sleeve 79 is provided with a glass seal 80 for sealing the tube after evacuation. The end of the supporting cylinder 75 remote from sole 50 is provided with an outwardly flared portion 75' which is connected to the inner surface of sleeve 79.

Traveling wave tube 10 may be provided with a collector electrode 28 for intercepting electrons after one traversal of the arcuate interaction space 49. This collector electrode may take the form of a projection from the inner wall of the cylindrical portion 13 of the tube envelope. The collector may be eliminated in some instances, however, and the electron stream made reentrant. The collector electrode 28 of the tube of Fig. 4, unlike that of Figs. 1 to 3, is mounted separately from the cylindrical portion of the tube envelope and is connected to a lead-in member 27 insulated from the envelope in the same manner as the lead-in members for the anode elements 25. Either arrangement of the collector electrode may be used according to the invention.

A suitable electric field between the slow wave propagating anode structure 42 and the sole 50 may be obtained by means of a voltage applied therebetween. The anode structure 42 may be maintained at a positive potential relative to both sole and cathode by means of a unidirectional source of voltage 82 whose negative terminal is connected to cathode lead 71 and whose positive terminal is connected by way of lead 46 and a choke coil 45 to one end of the slow wave propagating structure 42. Choke coil 45 provides isolation of the voltage source 82 from radio frequency energy. Sole 50 may be biased negatively with respect to cathode 55 by means of a source 83 of voltage connected between cathode lead 71 and metal sleeve 79. In some instances, however, the cathode may be at the same potential as the sole. The auxiliary electrode 57 may be maintained at a potential positive relative to the cathode 55 by means of a source 84 of voltage connected between leads 71 and 73.

A uniform magnetic field transverse to the direction of electron flow is provided by a permanent magnet or an electromagnet having cylindrical pole pieces 86 and 87 positioned on or adjacent tube 10. Pole piece 86 is apertured to receive the lead-in assembly 70 and the opposite pole piece 87 is apertured to maintain the field symmetrical. The flux lines should be concentrated in the interaction space 49 between the sole 50 and the anode structure 42. By proper adjustment of the magnitude and polarity of the electric and magnetic fields, the electron beams may be made to follow a circular path in the interaction space under the combined influence of these traversely disposed fields.

The invention is not restricted to a traveling wave tube having a localized cathode 55 such as shown in Figs. 1 to 3. For example, the elongated electrode 50 may be a continuous cathode which is either primarily or secondarily electron-emissive. If the periphery 51 of the elongated electrode 50 is coated with an electron emissive material, the localized cathode 55 and auxiliary electrode 57 may be omitted.

In Fig. 4, a schematic diagram of a traveling wave tube is shown which is similar to that of Figs. 1 to 3 except that a linear construction, rather than a cylindrical construction, is indicated for reasons of simplicity and also to illustrate that the invention is not restricted to a cylindrical traveling wave tube. Elements of Fig. 4 corresponding to those of Figs. 1 to 3 are indicated by the same reference numerals.

The external electrical network 40, which, in cooperation with the anode elements 25, forms the periodic slow wave propagating anode structure 42, includes several filter sections each including a coil 30 and a capacitor 38 connected in shunt therewith. Each of coils 30a, 30b, ... 30n is connected between the corresponding adjacent anode elements 25. A capacitor 38 is connected between the junction of successive coils and a common bus 44 which, for example, may be the cylindrical portion 13 of the tube envelope 12 of the device shown in Figs. 1 to 3. One of the endmost coils, that is, coil 30' is connected in series with the choke coil 45 to the voltage source 82 by way of a connecting lead 46. A resistor 47 connected at one end of the external electrical network 40 between coil 30' and the common bus 44 provides for termination of the network 40 in its characteristic impedance and substantially prevents reflected energy therein. Energy is extracted from output terminals 48, 49 of the network 40; terminals 48 and 49 are connected, respectively, to the common bus 44 and through a coil 30", in turn connected to the endmost anode element 25.

The output energy from the traveling wave tube of Fig. 3 may be extracted by means of a coaxial line 90 whose outer conductor 91 is connected to the common bus, that is, cylinder 13, and whose inner conductor 92 is connected through the last coil 30' to the anode element 25 nearest the downstream end of the tube, that is to say, the end of the tube from which the electron beam originates. A direct current isolating capacitor 94 is connected between coil 30' and the inner conductor 91 of coaxial line 90.

The invention is not limited to the external network 40 shown in Figs. 1 to 4. For example, the network 40 of Fig. 5 may be connected at appropriate points to the various anode elements 25 of traveling wave tube 10. The tube of Fig. 5 includes a first group of serially connected coils 93; a first set of alternate pairs of anode elements 25 are connected to the extremities of corresponding ones of these coils. The network 40 also includes a number of parallel circuits 94 each consisting of a capacitor 95 in shunt with an inductor 96; one such parallel circuit is connected between each successive pair of anode members 25. A second group of serially connected coils 98 also forms a portion of the external network 40; each coil 98 is connected between alternate pairs of anode elements 25 of a second set of alternate pairs of said elements displaced from said first set. The network 40 of Fig. 5, like that of Fig. 4, is terminated at one end in its characteristic impedance by a resistor 47 connected in series with a coil 99, whose inductance is substantially half that of coils 93 and 98, between point 101 and 102 of network 40. Isolation of the unidirectional potential sources from radio frequency energy is provided by choke coil 45, as in the tube of Figs. 1 to 4. A coil 102 whose inductance is substantially half that of coils 93 and 98 is connected between the point 103 on network 40 and one output terminal 49. The other output terminal 48 is connected to a junction point 104 of network 40. The external network of Fig. 5 has the properties of a band pass filter, as contrasted with network 40 of Fig. 4 which effectively is a low pass filter. This invention involves the use of a periodic slow wave propagating anode structure consisting of a series of individual cells or sections, each of which possesses substantially identical electrical characteristics, in other words, the invention is not limited to networks of the type shown in Figs. 4 and 5.

In Fig. 6 a modification of the device shown in Figs. 1 to 3 is disclosed which facilitates removal of heat generated within the traveling wave tube and permits satisfactory operation at relatively high power levels. This tube includes a hermetically sealed container 105 attached to the evacuated envelope 12 of traveling wave tube 10, as at junction 106.

Container 105 which at least partially surrounds the tube envelope 12, mays consist of an annular member 108 closed at the ends by end plates 109 and 110; the cylinder 13 of evacuated tube envelope 12 may form one of the walls of container 105. The mounting rings 31 and 32 for the coils 30 and the capacitors 38 of the external network 40 are supported from annular member 108 of the container 105, rather than from the cylinder 13 of the tube envelope 12, as in Figs. 1 to 3. The anode elements 25 are supported within the tube envelope by elongated lead-in members 27 which pass through insulators 29 and 112 set in the cylindrical portion 13 of tube envelope 12 and the annular member 108 of container 105, respectively. To facilitate heat removal, spaced thermally conductive fins 114 are arranged along the portion of the lead-in member 27 located within container 105. A dielectric fluid coolant 115 such as oil is circulated within the container, and respective inlet and outlet connections 117 and 118 are provided for connection to a fluid circulating system, including the usual fluid pump, not shown. The arrangement of inlet and outlet connections 117 and 118 in the cover plates of container 105 is suitable for a closed container completely encircling the tube envelope 12. If the container 105 is arranged to partially surround the tube envelope 12, fluid inlet and outlet connections, may of course, be provided at the respective ends of the container.

This invention is not limited to the particular details of construction, materials and processes described, as many equivalents will suggest themselves to those skilled in the art. It is, accordingly, desired that the appended claims be given a broad interpretation commensurate with the scope of the invention within the art.

What is claimed is:

1. An electron discharge device comprising an evacuated envelope containing an electron source, means for directing a beam of electrons from said source along an extended path, a network including a plurality of lumped inductive and capacitive elements disposed outside said envelope, an arcuate array of electrically conductive anode members also forming a portion of said network and positioned adjacent said path, said anode members being connected by means of electrically conductive elements extending radially from said arcuate array through said envelope to selected points along said network, said network and said anode members cooperating to form a periodic slow wave energy propagating structure in which there is induced by the electron beam an electromagnetic wave to generate oscillatory energy, and means for removing said energy from the end of said network away from which electrons are being directed.

2. An electron discharge device comprising an evacuated envelope containing an electron source, means for directing a beam of electrons from said source along an extended path, a network including a plurality of lumped inductive and capacitive elements disposed outside said envelope, an array of electrically conductive anode members positioned within said envelope adjacent said path and connected to selected points along said network, said network and said anode members cooperating to form a periodic slow wave energy propagating structure in which there is induced by the electron beam an electromagnetic wave traveling in a direction opposite that of the electrons to generate oscillatory energy, and means for removing said oscillatory energy from one end of said network.

3. An electron discharge device comprising an evacuated envelope containing an electron source, means for directing a reentrant beam of electrons from said source along an extended path, a network including a plurality of lumped inductive and capacitive elements disposed outside said envelope, an array of electrically conductive anode members positioned within said envelope adjacent said path and connected to selected points along said network, said network and said anode members cooperating to form a periodic slow wave energy propagating structure in which there is induced by the electron beam an electromagnetic wave traveling in a direction opposite that of the electrons to generate oscillatory energy, and means for removing said oscillatory energy from one end of said network.

4. An electron discharge device comprising an evacuated envelope containing an electron source and means for directing a beam of electrons from said source along an extended path, said means for directing including a magnetic field-producing device for creating a magnetic field perpendicular to said path, a network positioned outside said evacuated envelope and including a plurality of lumped inductive and capacitive elements, an array of electrically conductive anode members positioned within said envelope adjacent said path and connected by means of electrically conductive elements extending through said envelope perpendicular to said magnetic field to selected points along said network, said network and said anode members cooperating to form a periodic slow wave energy propagating structure in which there is induced by the electron beam an electromagnetic wave traveling in a direction opposite that of the electrons to generate oscillatory energy, and means for removing said energy from one end of said network.

5. An electron discharge device comprising an evacuated envelope containing an electron source and means for directing a beam of electrons from said source along an extended path, a network positioned outside said evacuated envelope and including a plurality of lumped inductive and capacitive elements, an array of electrically conductive anode members positioned within said envelope adjacent said path and connected to selected points along said network, said network and said anode members cooperating to form a periodic slow wave energy propagating structure in which there is induced by the electron beam an electromagnetic wave traveling in a direction opposite that of the electrons to generate oscillatory energy, means for removing said energy from one end of said network and means for terminating the other end of said network in a resistance equal to the characteristic impedance thereof.

6. An electron discharge device comprising an evacuated envelope containing an electron source, and means for directing a beam of electrons from said source along an extended path, a network positioned outside said evacuated envelope, an array of electrically conductive anode members positioned within said envelope adjacent said path and connected to selected points along said network, said anode array including a first set of alternate anode members and a second set of alternate anode members displaced from said first set, said network and said anode members cooperating to form a periodic propagating structure in which is induced by electron beams an electromagnetic wave to generate oscillatory energy, said network including a first group of serially connected inductive elements each interconnecting a pair of said first set of anode members and a second group of serially connected inductive elements each interconnecting a pair of said second set of anode members, said network further including a group of circuits each comprising an inductor connected in parallel with a capacitor, each of said circuits interconnecting successive anode members, and means for extracting energy from one end of said network.

7. An electron discharge device comprising an evacuated envelope containing an electron source, and means for directing a beam of electrons from said source along an extended path, a network positioned outside said evacuated envelope, an array of electrically conductive anode members positioned within said envelope adjacent said path and connected to selected points along said network, said anode array including a first set of alternate anode members and a second set of alternate anode members displaced from said first set, said network and said anode members cooperating to form a periodic propagating structure in which is induced by electron beams an electromagnetic wave to generate oscillatory energy, said network including a first group of serially connected inductive elements, each interconnecting a pair of said first set of anode members and a second group of serially connected inductive elements each interconnecting a pair of said second set of anode members, said network further including a group of circuits each comprising an inductor connected in parallel with a capacitor, each of said circuits interconnecting successive anode members, a first output terminal connected to one of the endmost inductive elements of said first group, a second output terminal, means for connecting one of the endmost inductive elements of said second group to said second terminal, and means for terminating the end of said network opposite the output end with a resistor whose impedance is equal to the characteristic impedance of said network.

8. An electron discharge device as set forth in claim 2 wherein said anode members are connected to said points along said network by elongated electrically conductive parts, a housing at least partially surrounding said envelope, said parts extending through said housing and carrying thermally conductive heat radiating vanes in the region thereof contained within said housing, and means for providing a continuous flow of electrically-insulating cooling fluid within said housing.

9. An electron discharge device as set forth in claim 2 wherein said inductive elements are serially connected and each inductive element interconnects an adjacent pair of said anode members, said capacitive elements each electrically interconnecting a corresponding anode member and a common bus, a first output terminal connected to said common bus, a second output terminal, and means for connecting the anode member at one end of said array to said second output terminal.

10. An electron discharge device as set forth in claim 4 wherein said inductive elements are serially connected and each inductive element interconnects an adjacent pair of said anode members, said capacitive elements each electrically interconnecting a corresponding anode member and a common bus, a first output terminal connected to said common bus, a second output terminal, and means for connecting the anode member at one end of said array to said second output terminal.

11. An electron discharge device as recited in claim 1 wherein said inductive elements are serially connected and each inductive element interconnects an adjacent pair of said anode members, said capacitive elements each electrically interconnecting a corresponding anode member and a common bus, a first output terminal connected to said common bus, a second output terminal, and means for connecting the anode member at one end of said array to said second output terminal.

12. An electron discharge device as recited in claim 2 wherein said inductive elements are serially connected and each inductive element interconnects an adjacent pair of said anode members, said capacitive elements each electrically interconnecting a corresponding anode member and a common bus, a first output terminal connected to said common bus, a second output terminal, means for connecting the anode member at one end of said array to said second output terminal, and means for terminating the end of said network removed from the output end by an impedance equal to the characteristic impedance of said network.

References Cited in the file of this patent

UNITED STATES PATENTS

| | | |
|---|---|---|
| 2,673,306 | Brown | Mar. 23, 1954 |
| 2,702,370 | Lerbs | Feb. 15, 1955 |
| 2,812,468 | Robertson | Nov. 5, 1957 |
| 2,817,040 | Hull | Dec. 17, 1957 |

FOREIGN PATENTS

| | | |
|---|---|---|
| 699,893 | Great Britain | Nov. 18, 1953 |

OTHER REFERENCES

Article by M. Muller, pages 1651 to 1658, Proceedings of the I.R.E. for November 1954, vol. 42, No. 11.